(12) United States Patent
Oh et al.

(10) Patent No.: US 7,214,251 B2
(45) Date of Patent: May 8, 2007

(54) COMPACT STEAM REFORMER

(75) Inventors: Young-Sam Oh, Incheon (KR);
Young-Soon Baek, Incheon (KR);
Won-Ihl Cho, Uijeongbu-si (KR);
Taek-Yong Song, Incheon (KR);
Jeong-Hwan Lee, Ansan-si (KR);
Sang-Eon Park, Daejeon (KR);
Ki-Won Jun, Daejeon (KR); Ri-Sang Choi, Busan (KR)

(73) Assignees: Korea Gas Corporation, Kyeonggi-do (KR); Kyungdong City Gas Co. Ltd., Ulsan (KR); Korea Research Institute of Chemical Technology, Daejon (KR)

( * ) Notice: Subject to any disclaimer, the term of this patent is extended or adjusted under 35 U.S.C. 154(b) by 0 days.

(21) Appl. No.: 10/128,735

(22) Filed: Apr. 23, 2002

(65) Prior Publication Data

US 2002/0152681 A1 Oct. 24, 2002

(30) Foreign Application Priority Data

Apr. 23, 2001 (KR) ............................... 2001-21823

(51) Int. Cl.
*B01J 8/00* (2006.01)
*B01J 8/04* (2006.01)
(52) U.S. Cl. ..................... 48/127.9; 422/197; 422/211
(58) Field of Classification Search ................ 422/190, 422/188, 189, 193–195, 201–203, 211, 196–197; 48/94, 61; 431/329, 326, 328
See application file for complete search history.

(56) References Cited

U.S. PATENT DOCUMENTS

| | | | | |
|---|---|---|---|---|
| 4,849,187 A | * | 7/1989 | Uozu et al. | 422/197 |
| 5,711,661 A | * | 1/1998 | Kushch et al. | 431/329 |
| 6,423,279 B1 | * | 7/2002 | Warren | 422/191 |
| 6,468,480 B1 | * | 10/2002 | Clawson et al. | 422/211 |
| 2002/0064487 A1 | * | 5/2002 | Sederquist et al. | 422/197 |

* cited by examiner

*Primary Examiner*—Glenn Caldarola
*Assistant Examiner*—Tom P. Duong
(74) *Attorney, Agent, or Firm*—Abelman, Frayne, Schwab

(57) ABSTRACT

The compact steam reformer of the present invention integrally comprises a housing; a reforming reactor having an upper mixing compartment for mixing natural gas and steam and a lower compartment for accommodating a catalyst bed; a natural gas feeding coiled pipe through which natural gas is introduced while being heated; a steam generating coiled pipe in which pure water is converted to steam by the exhaust; a metal fiber burner for heating the reforming reactor; a high-temperature converter for primarily removing carbon monoxide from a synthetic gas; a low-temperature converter for secondarily reducing the carbon monoxide level of the synthetic gas; and a heat exchanger, provided between the high-temperature converter and the low-temperature converter, for cooling the gas effluent from the high-temperature converter.

7 Claims, 4 Drawing Sheets

COMPACT STEAM REFORMER

BACKGROUND OF THE INVENTION

1. Field of the invention

The present invention relates, generally, to a compact steam reformer and, in particular, to a compact steam reformer in which a reforming reactor, a high- and a low-temperature converter, a heat exchanger, and a steam generator are integrated into a module, whereby hydrogen is generated at low cost.

2. Description of the Prior Art

On the whole, synthetic gas is obtained from natural gas or naphtha by the steam reformation on catalysts. A typical reforming process is exemplified by the following Reaction Equations 1 and 2:

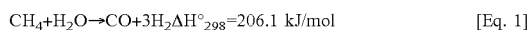

[Eq. 1]

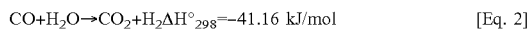

[Eq. 2]

Natural gas is first reacted with excess steam on a catalyst, for example, $Ni/Al_2O_3$ (Eq. 1) and then subjected to conversion reaction (e.g. hydrogenesis reaction, hydrogen conversion) (Eq. 2). According to final uses of the product gas, its equilibrium composition is determined by the conversion reaction which is carried out in two steps at high and low temperatures.

As denoted in Reaction Equation 1, the steam reforming reaction is highly exothermic. Depending on the next process, the operation conditions of the steam reforming reaction are determined within the pressure range of atmospheric pressure to 30 atm, and the temperature range of 700 to 900° C. In this reaction, excess steam is needed in order to prevent the deposition of coke on the catalyst. Typically, the mole ratio of $H_2O/CH_4$ is in the range of 2 to 6, depending on purposes of the product gas. In most cases, Ni-based catalysts are employed while K compounds i. e. $K_2O$, Ca, or MgO, serve as co-catalysts in order to restrain the deposition of coke. In the primary reforming reaction, generally, methane is converted at a ratio of 90–92% with concurrent production of carbon monoxide and hydrogen in addition to carbon dioxide and water. The closer to 3:1 the molar ratio between produced hydrogen and carbon monoxide is, the more ideal the reaction is.

Next to the primary steam reforming reaction, a secondary reaction may be conducted in which unreacted methane is removed through reaction with oxygen. In addition, there have been suggested processes that use combinations of methane, carbon dioxide and oxygen. The product gas obtained in the reforming reaction undergoes the two-step hydrogen gas conversion of high and low temperatures as shown in Reaction Equation 2, so that carbon monoxide is oxidized to carbon dioxide.

In the first step of the hydrogen gas conversion reaction, the oxidation of carbon monoxide to carbon dioxide occurs on a Fe catalyst at 330–530° C., while the second step is carried out at 200–260° C. in the presence of a Cu catalyst to react carbon monoxide with water to produce carbon dioxide and hydrogen. After passing through a conversion reactor in which most carbon monoxide is removed, the gas mixture contains hydrogen and carbon, along with trace amounts of unreacted methane and carbon monoxide. All or most of the carbon dioxide is removed through a pressure swing adsorption (PSA) process with concurrent yield of hydrogen of 99.9 vol % or higher.

With reference to FIG. 1, there is a conventional process flow of a steam reforming method for naphtha. As seen in this figure, the steam reformer system is a combination of independent modules, including a steam generator, reformers, a high temperature converter, a heat exchanger, and a low temperature reformer, and thus its structure is complex and difficult to make compact. Additionally, a flame burner type combustor to provide the heat required for the reforming reaction in the conventional reformer system occupies too large a space and cannot maintain a uniform temperature distribution in the reformer.

When applying the structure of FIG. 1 to an ICI method, which is suited for the generation of hydrogen for ammonia synthesis from naphtha, the steam reforming system of FIG. 1 is composed of a desulfurizer 1, a steam generator 2, primary and secondary reformers 3, and high and low temperature converters 4 and 5.

After being mixed with the steam produced from the steam generator 2 using a gas turbine arrangement or a separate steam boiler, naphtha which was previously deprived of sulfur in the desulfurizer 1 is passed through the primary reformer filled with nickel based catalysts to produce decomposed gases consisting mainly of hydrogen, carbon dioxide, carbon monoxide and methane. Owing to the endothermic nature of this decomposition reaction, the temperature of the reformer is maintained at 800 to 850° C. by use of a flame burner or a turbine arrangement. As for the reaction pressure, it is controlled according to the pressure required in the subsequent process. In the case of the generation of hydrogen for production of ammonia, the process is usually conducted at around 30 atm.

Then, the decomposed gases are deprived of methane in the secondary reformer 3. In this regard, pure oxygen is fed to the decomposed gases to partially oxidize methane into carbon monoxide and hydrogen. For additional oxidation of carbon monoxide into carbon dioxide, it is reacted with steam in the high- and low-temperature converters 4 and 5 with concurrent production of hydrogen. Thereafter, effluents from the converters 4 and 5 are transferred to an adsorption column or subjected to a PSA process in which the carbon dioxide of the effluents is utilized for production of potassium carbonate while hydrogen is obtained at a purity of 99.9 vol % or higher. Afterwards, for ultra purification of the hydrogen gas, the carbon monoxide that exists at a trace amount is converted into methane and water by reaction with hydrogen in a methanation reactor. The resulting hydrogen gas of ultra purity is compressed to 250 to 300 kg/cm² and transferred to an ammonia synthesis apparatus.

However, the conventional system for synthesizing hydrogen using a steam reforming reaction, like the ICI method, is too voluminous because it is composed of separate modules, such as a steam generator, a reformer, and a converter. Additionally, insulated pipes must be laid between the modules to communicate with each other for gas transfer. On the whole, the structure of the system is complex. Most of the reformers used in conventional systems are structured to have flame burner type combustors established at lower or upper parts thereof. However, such a combustor is unable to provide heat uniformly over the reactor.

U.S. Pat. No. 5,733,347 discloses a fuel gas reformer structure formed from flat plate reformer components. The fuel gas reformer structure itself is compact, but it requires the above-mentioned reactors additionally, so that the whole structure is not compact. Because the fuel gas reformer structure is heated from both sides by flanking burners, its temperature is elevated to a desired value within such a short period of time as to increase the efficiency of the fuel gas reformation. However, this efficiency is poorer than that of the structure having a burner surrounding a reformer.

A compact, multi-fuel steam reformer can be found in U.S. Pat. No. 5,938,800. This reformer, however, employs a flame burner and suffers from the disadvantage similar to that of U.S. Pat. No. 5,733,347.

PCT WO 98/08771 introduces a cylindrical reforming apparatus, which reforms natural gas by a combination of partial oxidation of methane and steam reformation to produce hydrogen and carbon dioxide, in which a reforming catalyst portion, a spiral pipe, and a converter are integrated. In the converter, the heat generated from the partial oxidation of natural gas with oxygen is utilized for steam reforming. The integration ensures the compactness of the structure to some extent, but the structure requires an additional apparatus, apart from the reformer, for generating steam outside and providing it to the reformer. Further, a separate oxygen generator is provided because pure oxygen is needed for the partial oxidation. Accordingly, much difficulty is found in setting up the structural modules in terms of time, cost and arrangement design. In addition, the reforming system is large in total volume. Requiring no oxygen generators, an alternative is suggested to use air instead of pure oxygen. In this case, however, the synthesized gas does not exceed a purity of 70 vol %, unlike that synthesized in the steam reforming reaction, owing to the presence of nitrogen in air.

Korean Pat. No. 246079 discloses a method for producing hydrogen and carbon monoxide from methane, in which the carbon dioxide and steam generated as the autoexhaust of methane is recovered to a rector, and used as materials, together with excess methane. This method enjoys the advantage of eliminating both a steam generator and a burner for providing a reaction heat because the recovered effluent contains both steam and heat. However, the reactor is provided installed, aside from the reformer. Accordingly, this method cannot make the reforming apparatus structure compact in total, therefore not solving the problems mentioned above.

Korean Pat. No. 156088 discloses a fuel reforming apparatus that uses methanol as a material for producing hydrogen-rich gas with a CO content less than 1% as well as a fuel for a burner for providing the heat necessary for the hydrogen production. In the fuel reforming apparatus, a single circular catalyst pipe is positioned at the center while a methanol burner is provided at a lower position. The heat generated from the burner is transferred in two directions of the inside and outside of the catalyst pipe to improve heat efficiency and make the catalyst bed of the pipe have a small temperature gradient. The circular type apparatus is certainly improved in thermal efficiency, but suffers from the problems caused by use of a flame burner in addition to being not compact on the whole.

Korean Utility No. 185299 refers to a burner for gas boilers, which comprises a burner plate in which a plurality of flame holes are provided, a damper plate for maintaining a constant fuel gas flow, a metal fiber layer formed of porous metal fiber or a ceramic fiber layer therebetween to stabilize flames. This burner is described to prevent flame-floating phenomenon and backfiring and to be low in noise level during combustion. However, the use of this burner is limited to hot water boilers in which the burner is used in an updraft. In addition, when a burner is used in such an outward manner that heat is emitted outwardly, a heat provision is difficult to provide to a reformer relative to when a burner is used in an inward manner that heat is focused inwardly. Further, where a burner is provided to a portion of an apparatus, a large temperature gradient may occur if heating begins from a proximal site of the location of the burner.

Korean Utility Laid-Open Pub. No. 2000-8520 relates to a burner formed of metal fibers. This burner, which is used in an outward manner for providing heat in a downdraft to a boiler, also suffers from the same problems as mentioned above.

SUMMARY OF THE INVENTION

Therefore, it is an object of the present invention to overcome the above problems encountered in prior arts and to provide a compact steam reformer, which has such an integral structure as to need no separate steam boilers and is excellent in energy efficiency.

It is another object of the present invention to provide a compact steam reformer, which adopts a cylindrical metal fiber burner as a heat source in such a structure as to perform heating in an inward manner, thereby securing sufficient heat for the reforming reaction.

Based on the present invention, the above objects could be accomplished by a provision of a compact steam reformer for converting natural gas into hydrogen and carbon dioxide, which comprises a housing; a reforming reactor, established in the housing, having two sectioned compartments for mixing natural gas and steam and for accommodating a catalyst bed; a metal fiber burner, being so structured as to surround the reforming reactor at a distance and to uniformly heat the reforming reactor in an inward manner; a heat exchanger for converting influent external water to steam by the heat of the burner exhaust; a high-temperature converter and a low-temperature converter provided outside of the burner; and a space, established between the high-temperature converter and the low-temperature converter, for preheating reactants and preventing the housing being overheated.

In accordance with an embodiment, there is provided a compact steam reformer, comprising: a housing provided with an exhaust outlet on the top and with a hydrogen outlet at a side portion; a reforming reactor, established in the housing, having an upper mixing compartment for mixing natural gas and steam and a lower compartment for accommodating a catalyst bed; a natural gas feeding coiled pipe, established above the reforming reactor, having an inlet at its one end through which natural gas is introduced therein and an outlet at the other end, said natural gas being heated by the exhaust during residence therein, said outlet being connected to the mixing compartment of the reforming reactor; a steam generating coiled pipe, established in the housing, having an inlet at its one end through which pure water is introduced therein and an outlet at the other end, said pure water being converted to steam by the exhaust during residence therein, said outlet being connected to the mixing compartment of the reforming reactor; a metal fiber burner, being so established as to surround the reforming reactor at a distance, for heating the reforming reactor; a high-temperature converter, provided out of the metal fiber burner with connection to the reforming reactor, for primarily removing carbon monoxide from a synthetic gas generated from the reforming reactor; a low-temperature converter, provided outside of the metal fiber burner with connection to the high-temperature converter, for secondarily reducing the carbon monoxide level of the synthetic gas by converting unreacted carbon monoxide into hydrogen and carbon dioxide; and a heat exchanger, provided between the high-temperature converter and the low-temperature converter, for cooling the gas effluent from the high-temperature converter to a temperature suitable to conduct the conversion of unreacted carbon monoxide into hydrogen and carbon dioxide in the low-temperature converter.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
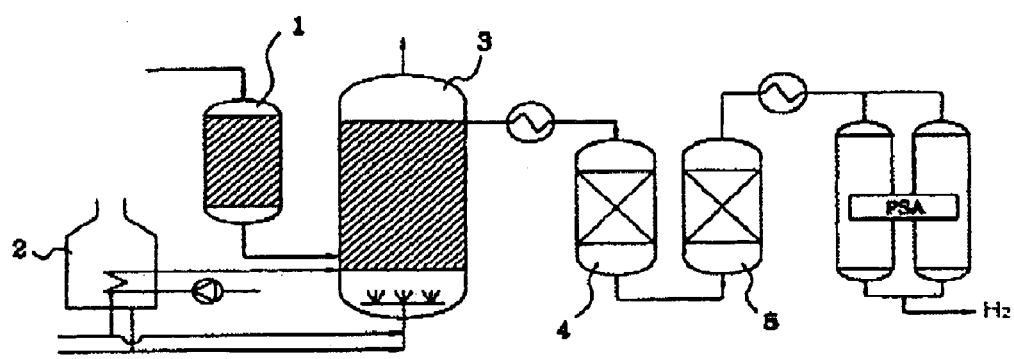
FIG. 1 is a schematic view illustrating a steam reforming process in a conventional reformer system.

The application of the preferred embodiments of the present invention is best understood with reference to the accompanying drawings, wherein like reference numerals are used for like and corresponding parts, respectively.

Figure 2:
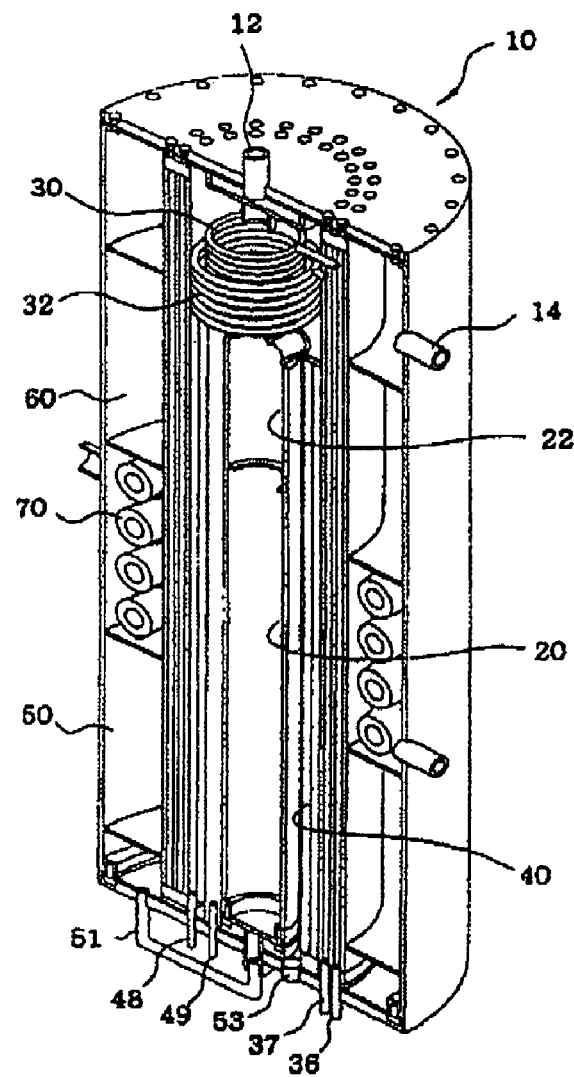
FIG. 2 is a sectioned, perspective view illustrating a compact steam reformer of the present invention.
Figure 3:
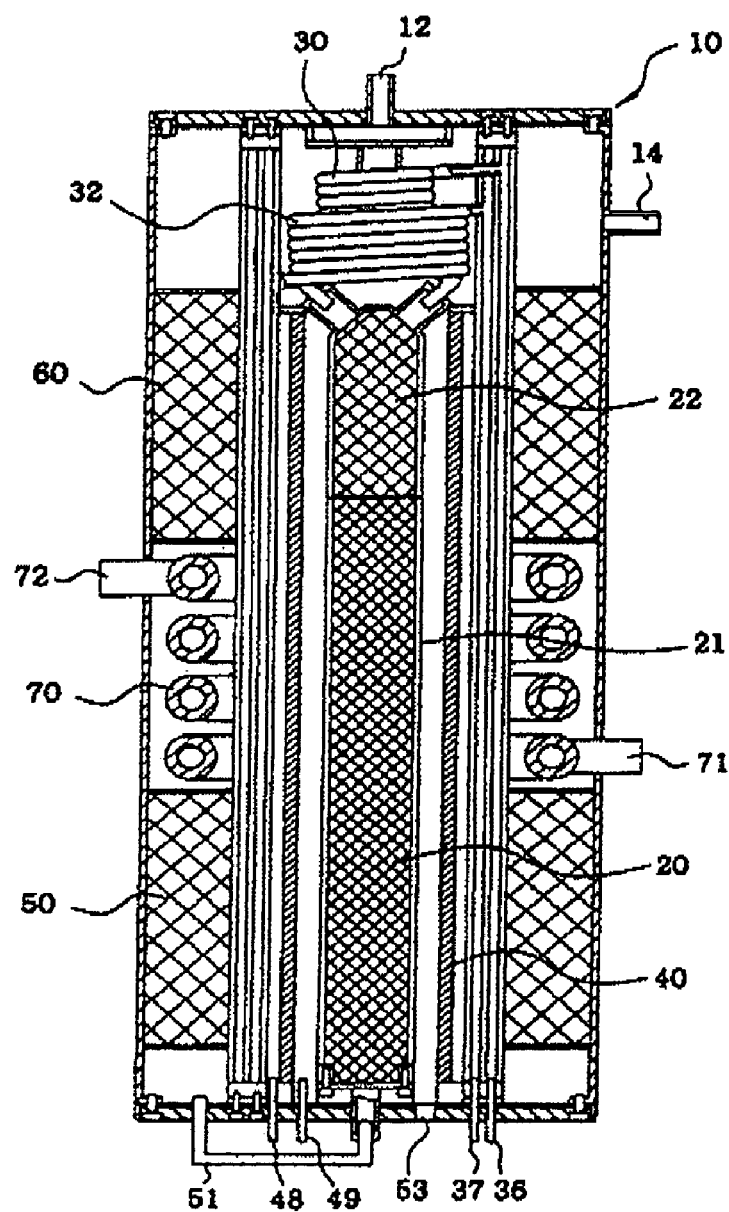
FIG. 3 is a cross sectional view illustrating the compact steam reformer of the present invention.

Referring to FIGS. 2 and 3, a compact steam reformer of the present invention is shown in a sectioned, perspective view and a cross sectional view, respectively. As seen in these figures, the compact steam reformer has a cylindrical housing 10 that is provided thereon with an outlet 12 for burner exhaust and with an outlet 14 for hydrogen at an upper portion thereof. A reforming reactor 21 is cylindrical and is established along the lengthwise direction at the central portion of the housing 10. The reforming reactor 21 comprises two sectioned compartments for mixing natural gas and steam and for accommodating a catalyst bed. That is, a mixing portion 22 for admixing a natural gas (or hydrocarbons such as methane gas) and a steam is positioned at an upper central portion of the housing. Beneath the mixing portion 22, a reforming catalyst bed 20 is provided for converting the natural gas (or hydrocarbons) into hydrogen and carbon monoxide. Surrounding the reforming reactor 21, a metal fiber burner 40 is provided, apart from the reforming reactor 21, for providing heat to the reforming reactor 21. Being located over the reforming reactor 21, a natural gas feeding pipe 30 and a steam generating pipe 32 are connected to the reforming reactor 21. To the natural gas feeding pipe 30 and the steam generating pipe 32 are respectively connected a natural gas preheating space 33 and a pure-water preheating space 34, both provided around the metal fiber burner 40. The natural gas-preheating space 33 and the pure-water preheating space 34 are extended to inlets 36 and 37 for natural gas and pure water, respectively, which are provided at the bottom of the housing 10 and through which natural gas and pure water are injected into the housing 10. In such a structure, natural gas and pure hydrogen, after being provided through their corresponding inlets, are preheated by the heat conducted from the metal fiber burner 40 while passing through the natural gas preheating space 33 and the pure-water preheating space 34 to the natural gas feeding pipe 30 and the steam generating pipe 32, respectively. In this regard, the natural gas preheating space 33 and the pure-water preheating space 34 have the effect of not only effectively using the heat released externally from the metal fiber burner 40, but also preventing the housing from being overheated. Being effluent from the natural gas feeding pipe 30 and the steam generating pipe 32, the natural gas and the pure water are admixed in the mixing portion 22. The steam generating pipe 32 is long enough to convert the water into steam. Preferably, the steam generating pipe 32, when formed of ¼" SUS, must have a length of 3.5 m or longer in order to maintain the steam effluent from the steam generating pipe 32 at 600° C. or higher. Also, the natural gas-proving pipe 30, when being established with ¼" SUS, is required to be at least 0.22 m long in order to keep the natural gas effluent at 600° C.

As mentioned above, the metal fiber burner 40 is provided at a periphery of the reforming reactor 21. Preferably, the metal fiber burner 40 is 2–5 cm distant from the reforming reactor 21. The burner 40 is made of a metal cloth that is woven from metal fibers, which may be prepared from metal alloy. Such a metal cloth is commercially available. The metal fiber burner 40 is structured such that the heat generated by the combustion of the gas mixture in the metal fiber burner 40 is inwardly directed and thus uniformly distributed over the reforming reactor 21. The gas mixture supplied into the metal fiber burner 40 is ignited by a plug 49 provided in the bottom of the housing 10.

Figure 4:
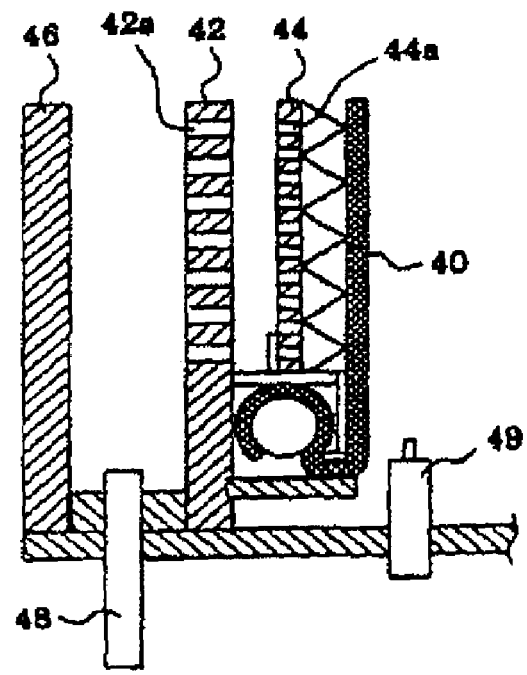
FIG. 4 is a partial expanded view illustrating a metal fiber burner of the compact steam reformer of the present invention.

Turning now to FIG. 4, the metal fiber burner 40 is illustrated, in detail, in a partial expanded view. As shown in this figure, a first distribution membrane 42 and a second distribution membrane 44, both cylindrical, are radially provided, in sequence, at predetermined distances from the exterior, surrounding the metal fiber burner 40. A plurality of spaced-apart holes 42a for providing fuel are formed in longitudinal and radial directions in the first distribution membrane 42. In the second distribution membrane 44, there are also provided a plurality of spaced-apart holes 44a that are different in size from those of the first distribution membrane 42. Outside of the first distribution membrane 42, a shielding membrane 46 is present at a distance therefrom. A fuel supply pipe 48 is installed in the bottom between the shielding membrane 46 and the first distribution membrane 42. A fuel, such as natural gas (LNG), propane, or butane, is introduced through the fuel supply pipe 48 into the housing 10 and penetrates into the metal fiber burner 40 through the fuel supply holes 42a and 44a. A flame detector 53 is installed at a suitable position to confirm the ignition of the fuel. In order to supply the fuel gas uniformly into the metal fiber burner 40, the fuel supply holes 44a of the second distribution membrane 44 are preferably smaller in diameter than those 42a of the first distribution membrane 42. Further, the fuel supply holes 42a and 44a preferably become larger as they are located in lower positions of the first and the second distribution membranes 42 and 44 in order not to form a temperature gradient over the surface of the metal fiber burner 40.

Returning to FIGS. 2 and 3, the synthetic gas effluent from the reforming catalyst bed 20 of the reforming reactor 21 passes through a transfer pipe 51 into a high-temperature converter 50, which is arranged inside of the housing 10, but outside of the metal fiber burner 40. The transfer pipe 51 is adjusted to a temperature suitable for high-temperature reforming reaction by heat exchange with air. The transfer pipe 51, if necessary, may be changed in shape and/or length or may be equipped with a heat exchanger. In the high-temperature converter 50, the synthetic gas mixture emanating from the reforming reactor 21 includes hydrogen, carbon monoxide and excess steam, the latter two of which are converted into hydrogen and carbon dioxide through hydrogen conversion reaction at 330–530° C.

To reduce the carbon monoxide level of the gas mixture effluent from the high-temperature converter 50 to several ppm, a low-temperature converter 60 is established at an upper portion of the housing 10. Between the high temperature converter 50 and the low temperature converter 60 is provided a coiled heat exchanger 70 that has an inlet 71 at a lower portion and an outlet at a upper portion to reduce the low-temperature conversion reaction to the range of 200 to 260° C. Circulating a coolant therethrough, the heat exchanger 70 exchanges heat with the gas mixture to control the temperature of the gas mixture. The coolant flowing through the heat exchanger 70 may be cooling water or gas. The heat exchanger 70 may be changed in shape depending on its uses. After completion of the low-temperature conversion reaction, the hydrogen mixture gas is drained out from the low-temperature converter 60 through the hydrogen outlet 14 provided at an upper portion of the housing 10.

To produce hydrogen in the reformer of the present invention, an electric field is applied to the plug 49 to generate a spark after which a mixture of natural gas and air is introduced through the fuel supply pipe 48 into the housing 10 and fired over the surface of metal fiber burner 40 by the spark. When flames on the metal fiber burner 40 are identified by the flame detector 53, a nitrogen gas and pure water are fed through the inlets 36 and 37, respectively. While passing through the natural gas preheating space 33 and the pure water preheating space 34 into the natural gas feeding pipe 30 and the steam generator 32, respectively, the nitrogen gas and the pure water are preheated in addition to acting to prevent overheating of the housing 10. Then, together with the steam generated by heating the pure water in the steam generator 32, the preheated nitrogen gas emanating from the natural gas feeding pipe 30 is fed into a mixing portion 22 of the reforming reactor 21. At this time, the mixture of nitrogen gas and steam preheats the reforming catalyst bed 20, as well as preventing the catalyst from being overheated to the point of deterioration by the metal fiber burner 40. Meanwhile, after the combustion of the fuel gas, the high temperature burner exhaust thus produced moves to the outlet 12 provided on the top of the housing 10 while heating the natural gas feeding pipe 30 and the steam generating pipe 32, thus converting the pure water into steam.

In addition, when the reforming catalyst bed 20 is heated by the metal fiber burner 40 and the nitrogen mixture gas to a temperature of 700 to 900° C., which is suited for the steam reforming reaction, natural gas (hydrocarbons) is fed, instead of nitrogen gas, through the natural gas feeding pipe 30. In this regard, the molar ratio of the natural gas to the steam is preferably in the range of 3 to 6.

As mentioned above, the natural gas introduced into the housing experiences the two-step preheating process before being mixed with steam already present in the mixing portion 22 and then, is introduced into the reforming catalyst bed 20 in which hydrogen and carbon monoxide are synthesized from the natural gas.

The synthetic gas mixture with excess steam is transferred through the transfer pipe 51 to the high-temperature converter 50 in which the carbon monoxide level is reduced through the reaction between carbon monoxide and steam at 330 to 530° C. in the presence of an Fe catalyst. Subsequently, the synthetic gas mixture is supplied to a low-temperature converter 60 after being reduced to a temperature suitable for low-temperature conversion, for example, 200 to 260° C. by the heat exchanger 70. In the low-temperature converter 60, the unreacted carbon monoxide of the synthetic gas mixture is converted into carbon dioxide and steam in the presence of a Cu catalyst, so that the carbon monoxide level of the synthetic gas mixture is reduced to tens of ppm. As a result, the synthetic gas mixture is composed mainly of hydrogen and carbon dioxide, substantially free of carbon monoxide. The resulting hydrogen gas of high concentration is drained out through the outlet 14. After being treated by a pressure swing adsorption (PSA) apparatus, the hydrogen gas mixture is thoroughly deprived of carbon dioxide to yield hydrogen gas of high purity. In this connection, the PSA apparatus may be structured to suit the final uses of hydrogen.

Having a cylindrical housing 10 in which a reforming reactor 1, a high-temperature converter 50, a low-temperature converter 60, a heat exchanger 70, and a steam generator 32 are integrated, the steam reformer of the present invention can be fabricated into a small, compact size. Thus, the steam reformer of the present invention can be easily established in situ in addition to showing a high efficiency in synthesizing hydrogen.

For use in heating the reforming reactor 21, the cylindrical metal fiber burner 40 is employed, instead of conventional flame combustion type burners, in accordance with the present invention. Over the conventional flame combustion type burners, the cylindrical metal fiber burner 40 has the advantage of occupying a smaller space. Additionally, because the cylindrical metal fiber burner 40 is structured to perform heating not in such an outward manner as to emit heat externally, but in such an inward manner as to focus heat internally, sufficient heat for the reforming reaction can be secured. Another advantage of the steam reformer is that its calorie output can be easily controlled within the range of 100 to 800 kW/m2. Established to surround the reforming reactor 21, the metal fiber burner 40 heats the total area of the reforming reactor 21 in such a manner that uniform temperature is maintained over the catalyst bed in the reforming reactor 21, thereby bringing about a significant improvement in the conversion efficiency.

In the steam reformer, the high temperature exhaust produced as a result of the combustion of the fuel gas can be used to vaporize the water in the steam generating pipe 32, so that steam is supplied to the reforming reactor 21. Accordingly, because there is no need to employ an additional boiler to generate steam, the steam reformer is fabricated into a simple structure at low cost in addition to cutting down the energy required for the operation.

EXAMPLE

Using a steam reformer of the structure illustrated in FIGS. 2 and 3, hydrogen was obtained. In the steam reformer, the housing was formed of SUS 304 with a diameter of 235 mm and a length of 600 mm. The reforming reactor 21, made of Inconel, was 450 mm long with a diameter of 25.4 mm and filled with about 400–700 ml of an Ni catalyst (patent pending with Korean Pat. Appl'n No. 2000-54443, Sep. 16, 2000, entitled "Ni-based reforming catalyst for production of synthetic gas and method for producing synthetic gas from natural gas through steam reforming by use of the same") at its lower portion. In an upper portion of the reforming reactor 21, a mixing portion for admixing methane gas and steam was formed to occupy one third of the total volume of the reforming reactor 21. Both the natural gas feeding pipe 30 and the steam generating pipe 32 were made of Inconel with a diameter of 6.35 mm. As for their lengths, 600 mm was set for the natural gas feeding pipe 30 and 3,800 mm for the steam generating tube 32. The metal fiber burner 40 was established at a distance of about 30 mm from the reforming reactor at its periphery. Located in such a way as to surround a lower portion of the metal fiber burner 40 at a distance, the high-temperature converter 50 had a height of 150 cm and a thickness of 105 mm and was filled with about 500 cm3 of an Fe catalyst. As for the low-temperature converter 60, it was 150 mm high with a diameter of 105 and was filled with about 500 cm3 of a Cu catalyst. Between the high-temperature converter 50 and the low-temperature converter 60 was located a pin-tube type heat exchanger which was 3,500 mm long with a diameter of 19 mm.

Natural gas was fed at a rate of 0.48 m3/hr through the inlet 36 into the reforming reactor 10 while pure water was fed at a rate of 4.28×10−3 m3/hr through the inlet 37. Natural gas fuel was provided at a rate of 0.93 m3/hr and air at a rate of 24.04 m3/hr through the fuel supply pipe 48 to the metal fiber burner 40. As a result of performing hydrogen synthesis in the steam reformer under commercially favorable conditions, a gas mixture comprising 0.1% of methane, 0.9% of steam, 77.2% of hydrogen, 0.1% of CO, and 19.2% of CO2, was drained out of the outlet 14 at a rate of 6.58 m3/hr. The catalyst bed 20 of the reforming reactor 21 was maintained at 789° C. on average while the conversion in the high temperature converter 50 and the low temperature converter 60 was conducted at 463° C. and 228° C., respectively.

As described hereinbefore, the steam reformer of the present invention can be made compact and miniaturized by integrating a reactor, a heat exchanger, and a steam generator. Accordingly, the compact steam reformer enjoys the advantage of being easy to install in situ and being fabricated at low cost. Additionally, the cylindrical metal fiber burner can provide heat uniformly over the reforming reactor, thereby maximizing the reforming efficiency. Provided between the metal fiber burner and the converter, a space in which reactants are preheated enhances energy efficiency and prevents the overheating of the housing by shielding the heat emitted from the metal fiber burner. Another means for enhancing energy efficiency is found in the structure utilizing the heat of the burner exhaust in generating steam. This structure also brings about an effect of reducing the cost of the reformer because no additional steam generators are required.

In combination of a PSA apparatus, the compact steam reformer of the present invention can produce hydrogen with a purity of 99.9 vol %. Particularly, this compact steam reformer is very usefully applied where continuous hydrogen supply is needed on a small scale.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A compact steam reformer for converting natural gas into hydrogen and carbon dioxide, comprising:
    a housing;
    a reforming reactor, established in the housing, having two sectioned compartments for mixing natural gas and steam for accommodating a catalyst bed;
    a metal fiber burner, surrounding the reforming reactor in an inward manner;
    a high temperature converter, established outside of the metal fiber burner to communicate with the reforming reactor, for primarily removing carbon monoxide from the synthetic gas introduced from the reforming reactor;
    a low-temperature converter, established outside of the metal fiber burner to communicate with the high-temperature converter, for secondarily reducing the carbon monoxide level of the synthetic gas by converting unreacted carbon monoxide into hydrogen and carbon dioxide;
    a heat exchanger, provided between the high-temperature converter and the low-temperature converter, for cooling the gas effluent from the high temperature converter to a temperature suitable to conduct the conversion of unreacted carbon monoxide into hydrogen and carbon dioxide in the low-temperature converter;
    a steam-generating coiled pipe which is placed in an upper portion of the housing and which converts water into steam by the heat generated from the exhaust; and
    in which the steam reformer with the reactors is integrated in one housing and characterized in generating steam with the exhaust in the above reforming devices without placing separate steam boilers externally.

2. The compact steam reformer as set forth in claim 1, further comprising pathways, provided outside of the metal fiber burner, for guiding externally introduced natural gas and water, playing a role in shielding the heat emitted from the metal fiber burner, said natural gas and water being preheated during the passage.

3. A compact steam reformer, comprising:
    a housing provided with an exhaust outlet on the top and with a hydrogen outlet at a side portion;
    a reforming reactor, established in the housing, having an upper mixing compartment for mixing natural gas and steam and a lower compartment for accommodating a catalyst bed;
    a natural gas feeding coiled pipe, established above the reforming reactor, having an inlet at its one end through which natural gas is introduced therein and an outlet at the other end, said natural gas being heated by the exhaust during residence therein, said outlet being connected to the mixing compartment of the reforming reactor;
    a steam generating coiled pipe, established in the housing, having an inlet at its one end through which pure water is introduced therein and an outlet at the other end, said pure water being converted to stream by the exhaust during residence therein, said outlet being connected to the mixing compartment of the reforming reactor;
    a metal fiber burner, surrounding the reforming reactor at a distance, for heating the reforming reactor;
    a high-temperature converter, provided out of the metal fiber burner with connection to the reforming reactor, for primarily removing carbon monoxide from a synthetic gas generated from the reforming reactor;
    a low-temperature converter, provided outside of the metal fiber burner with connection to the high-temperature converter, for secondarily reducing the carbon monoxide level of the synthetic gas by converting unreacted carbon monoxide into hydrogen and carbon dioxide;
    a heat exchanger, provided between the high-temperature converter to a temperature suitable to conduct the conversion of unreacted carbon monoxide into hydrogen and carbon dioxide in the low-temperature converter; and in which the steam reformer with the reactors is integrated in one housing and characterized in generating steam with the exhaust in the above reforming devices without placing separate steam boilers externally.

4. The compact steam reformer as set forth in claim 3, wherein the housing comprises:

a pure-water preheating space, established at a periphery of the metal fiber burner, for guiding pure water from its inlet provided on the bottom of the housing to an outlet connected to the steam generating pipe, said pure water being preheated by the metal fiber burner during transport through the preheating space; and a natural gas preheating space, established at a periphery of the metal fiber burner, for guiding natural gas from its inlet provided on the bottom of the housing to an outlet connected to the natural gas feeding coiled pipe, said natural gas being preheated by the metal fiber burner during transport through the preheating space.

5. The compact steam reformer as set forth in claim 3, wherein a first distribution membrane and a second distribution membrane, both cylindrical, are radially provided, in sequence, at predetermined distances from the exterior, surrounding the metal fiber burner, each of the first distribution and the second distribution membranes having a plurality of spaced-apart holes for providing fuel formed in longitudinal and radial directions.

6. The compact steam reformer as set forth in claim 5, wherein the holes of the first distribution membrane are smaller in diameter than those of the second distribution membranes, the holes formed in an upper portion are larger in diameter than those formed in a lower portion.

7. The compact steam reformer as set forth in claim 3, wherein the steam-generating coiled pipe is long enough to convert water into steam by the heat generated from the exhaust.

* * * * *